April 8, 1930. J. M. CAGE 1,754,009
DEHYDRATION OF OIL AND WATER EMULSIONS
Filed Sept. 17, 1927 3 Sheets-Sheet 2

Inventor
John M. Cage
Attorney

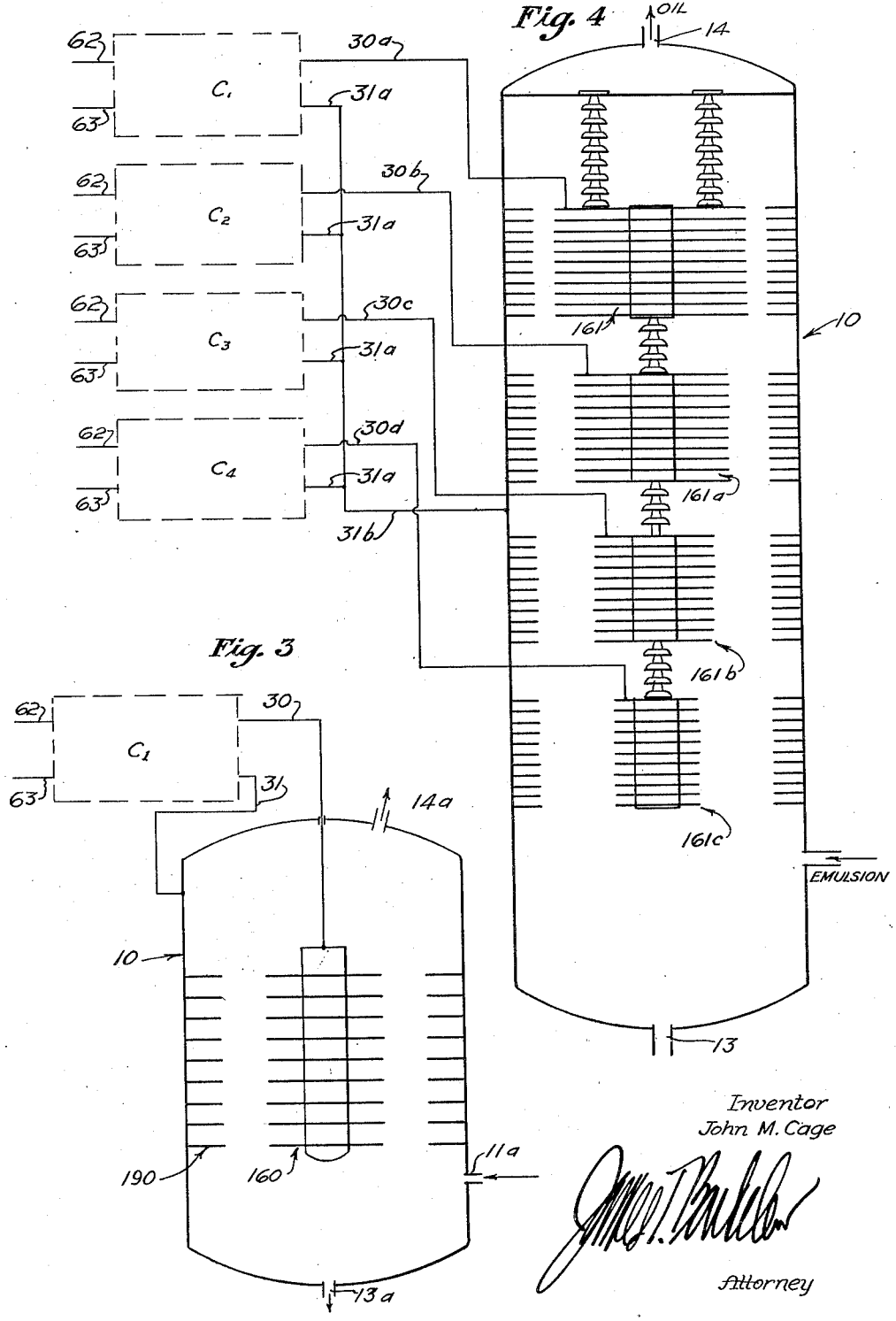

Patented Apr. 8, 1930

1,754,009

UNITED STATES PATENT OFFICE

JOHN M. CAGE, OF LOS ANGELES, CALIFORNIA, ASSIGNOR, BY MESNE ASSIGNMENTS, TO DEHYDRATORS INCORPORATED

DEHYDRATION OF OIL AND WATER EMULSIONS

Application filed September 17, 1927. Serial No. 220,169.

This invention has relation to separation, by electrical means, of the constituent elements of an emulsion, such as that formed by water and oil. Although the invention is not necessarily limited in its application to an oil and water emulsion, its economic value resides most largely in the separation of natural oil emulsions; and the following specification will therefore describe the invention as applied to that specific purpose.

Oil and water emulsions will need no extended description here, as their natures and characteristics are well known. Although such an emulsion may be of the oil-in-water type and my invention is applicable to that type, the natural emulsions most frequently encountered are of the water-in-oil type and the invention will be specifically described with that type in view. That type of emulsion consists of very fine globules of water surrounded by films which will not break down under the action of gravity to allow the water to settle out. Frequently such emulsions carry minerals and salts in suspension and solution, such minerals and salts apparently facilitating the initial formation and stability of the emulsions. Speaking in a general way, it is advantageous in any process of separation to separate the water in liquid form and ultimately by settlement, as thereby the matter in solution, and to a large extent the matter in suspension, is carried down by the settling water. This general object is accomplished by the electrical process which consists broadly in passing the emulsion through an electrical field under the influence of which the minute globules of water, becoming ionized, repel and attract each other, dependent upon the signs of their respective ionizations, and thus tend to coalesce and form progressively larger and larger globules until bodies of water are formed large enough to settle out by gravity.

The primary object of my invention is improvement in efficiency of the electrical method of separation, including improvement in efficiency as regards current consumed, percentage of water to which the emulsion is dehydrated, and as regards cost and operating capacity of apparatus, and cost of operating. Although there are several other features of my invention set forth hereinafter, its outstanding characteristic feature resides in its application, to any emulsion, of potential gradients in inverse ratio to the conductivity of the emulsion. Original emulsions as they enter the treating apparatus may and do vary very largely in their conductivity, due mainly to their varying water and other contents. Furthermore, as an emulsion is treated and its water changed in physical form or as its water gradually drops out, the emulsion changes in its conductivity. My investigations have developed the fact that the most efficient electrical dehydration is accomplished when the potential difference per unit distance, or the potential gradient, is maintained as high as possible without danger of formation of a conducting path with subsequent power arc through the emulsion; and it is characteristic of my invention that, for emulsions of varying initial conductivity, or of varying conductivity while being treated, the effective potential gradient applied to the emulsion be maintained as high as practicable but below the point at which a conducting path will be formed. Furthermore my invention provides automatic means for maintaining the desired potential gradient; it therefore not only maintains at all times the conditions of highest efficiency but also automatically guards against the possibility of power arc.

In the following specification I describe two major variant means by which the fundamental objects of my invention are attained: One of such means involving passage of the emulsion between several sets of electrodes successively. These electrodes may have, but not necessarily, a constant potential difference between them and a successive diminution in their spacings which increases the potential gradient which is applied to the emulsion as it is gradually cleared of its water; and in such an arrangement it is preferable to have the several sets of electrodes somewhat spaced so as to obtain, between successive electrode sets, zones in which the ionic action of the electrodes is relatively diminished, affording the charged water particles opportunity to act more or less exclusively or predominantly under their own ionic agitations, thus to coalesce to form larger particles.

On the other hand the maintenance of potential gradients at or near the most efficient point may be accomplished by electrical regulation controlled by the emulsion present between electrodes, so that the potential gradient is increased as the conductivity diminishes. This form of regulation may be applied to a single set of electrodes and even to treatment of emulsions in batches, but it is just as well applicable to the continuous treatment of emulsions.

Furthermore the two major forms of the invention may be combined in a single apparatus and in a single procedure, as will be hereinafter further explained; and it will also be explained how the method, in such combined form, takes care of both variation in conductivity of differing original emulsions and also of variation in conductivity of any given emulsion during its process of treatment.

But, whatever control system, or system combination, may be used for maintaining the potential gradient, that gradient is maintained at the point giving most efficient and copious action. When an emulsion is passed through an electric field between spaced terminals, there is, for any given terminal electrode spacing and any given emulsion, a certain potential gradient at which the water particles will tend to gather in chains forming conductors between the electrodes. When this occurs, the conductivity rapidly increases until arcing takes place. Such arcing is detrimental to the oil as well as wasteful of current. To get best results it is necessary not only to prevent arcing but also to prevent conductive chain formation.

In an emulsion being treated between the electrodes of a high potential alternating current circuit, the water particles in contact with the elecarodes are ionized and repelled. When the current flow reverses, other water particles are ionized to the opposite sign and in turn repelled. Successive waves of ionized water particles are thus sent out from each electrode toward the opposite electrode, until all the water particles between the electrodes are ionized. If the potential gradient is not too high, and does not cause too violent ionic agitation of the water particles, these ionized particles tend, under their own ionic action, to coalesce into larger and larger bodies. If, however, the potential gradient is too high, for any given emulsion, and the ionized water particles are driven and attracted across the entire electrode spacing without any substantial opportunity to act under their own ionic attractions and repulsions, the water particles then tend to form filaments or chains which become conductors. The current then immediately flows through those chains from electrode to electrode, and the current flow through the emulsion is thus changed in characteristic from ionic flow, which may be compared with convection, to ordinary current flow, which is conductive. Such conductive flow increases the current consumption without corresponding efficiency increase, in fact rather destroying efficiency.

It is characteristic of my invention that the potential gradient is at all times maintained as high as possible below the gradient that causes conductive flow, so as to maintain ionization at the greatest possible rate but so as to maintain nothing but ionization. Thus the current flow between electrodes is exclusively ionic (convective) and a small current consumption gives the maximum efficiency. The limiting potential gradient varies, mainly with the water proportion of the emulsion; a lower gradient being applicable to an emulsion containing more water, a higher gradient to one containing less water. The emulsion with more water has the greater ionic conductivity, that with less water the lesser conductivity.

If chains are formed, those in the emulsion of higher water percentage have greater conductivity because of the larger water sections and the close proximity of aligned water bodies; while those in the emulsion of lower water content have greater resistance or greater di-electric strength, because of the lesser amount of water and the wider spacings of water particles in the chains. The potential gradient control, inversely as the emulsion conductivity, maintains the gradient at the most effective value and prevents formation of conductive chains, resulting in power arcs.

It may be noted that, in theory, the time element of treatment may be a factor in determining the gradient applicable to any given emulsion, because given time enough, a low potential gradient might eventually cause chain formation. But this does not seem, in practice, to be the case; because, at potential gradients that are not high enough to form conductive chains immediately, the water particles coalesce under their own ionic actions to form larger bodies; and if then the electrodes are far enough spaced that these larger water bodies will not bridge them, no conductive chain or path is formed. It would seem that, depending on the potential gradient in any given emulsion, the water particles are either formed into chains, or are ionized and allowed to coalesce under their own ionic agitation; the two types of action being substantially mutually exclusive and the ionic-agitation and coalescence type being many times as efficient, both as to apparatus capacity, current consumption and final low water content of the treated emulsion.

Figure 1:
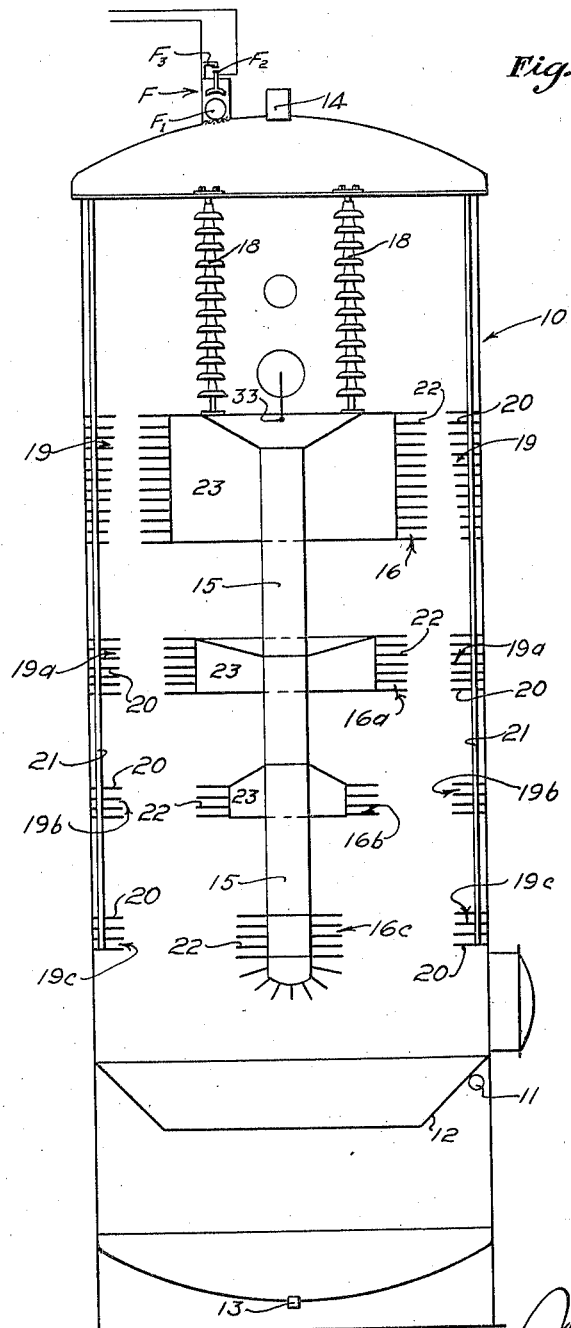
Fig. 1 represents diagrammatically and without any attempt at structural detail the essential physical features of a dehydrator designed in accordance with my invention.
Figure 2:
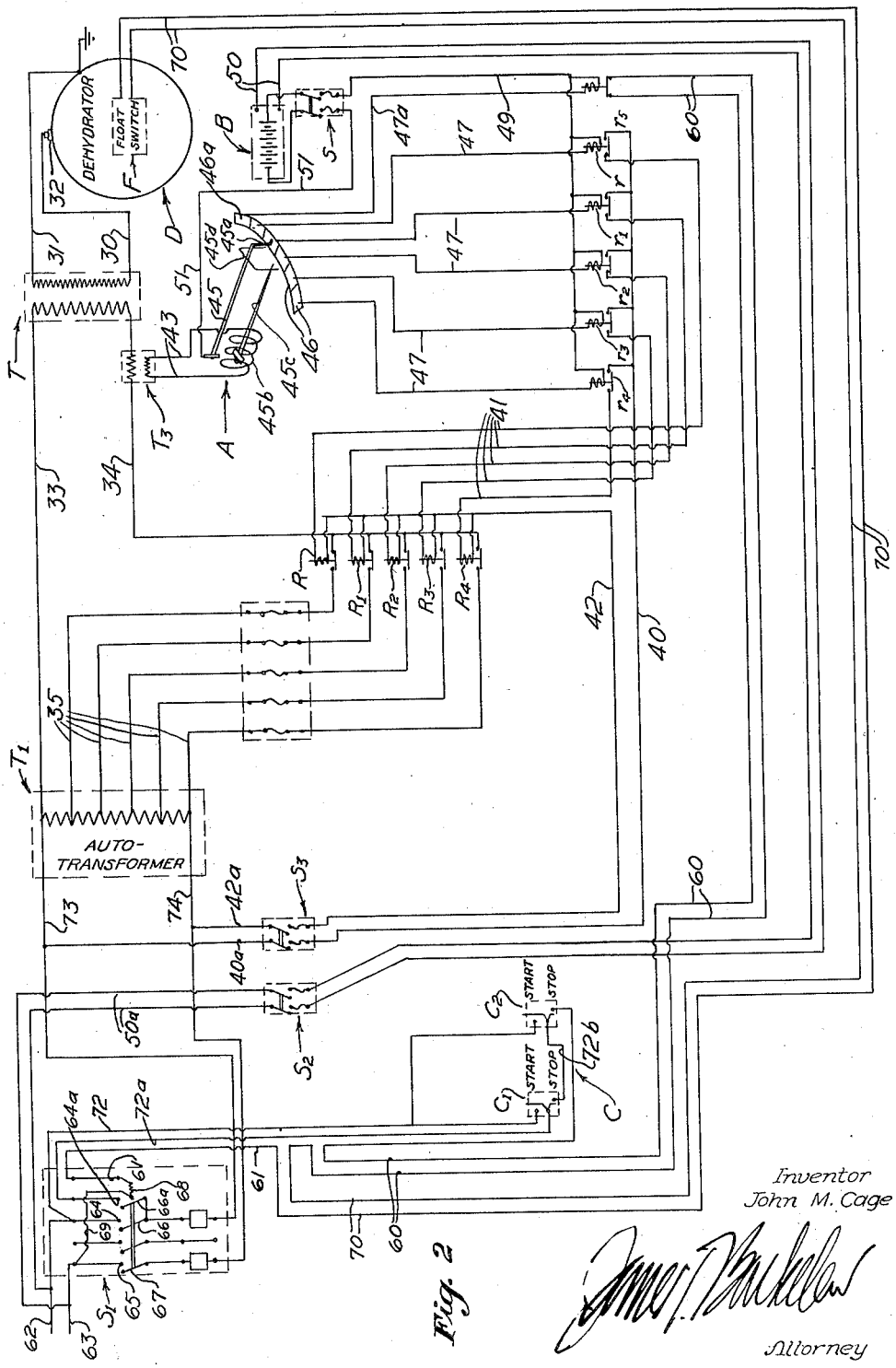
Fig. 2 represents diagrammatically the electrical features of my invention, which may be used in combination with any simple dehydrator provided with electrodes or in combination with the dehydrator shown in Fig. 1.

Fig. 3 indicates diagrammatically the application of the electrical control features of Fig. 2 to a simple dehydrator; and Fig. 4 is a diagram illustrating in simple form another combination of the physical apparatus of Fig. 1 with electrical equipment such as shown in Fig. 2.

Let us consider first the physical apparatus of Fig. 1 and its inherent method of operation, leaving consideration of Fig. 2 and the automatic electrical control and its combination with the physical apparatus of Fig. 1 to be considered later. In considering the apparatus of Fig. 1 no attention will here be paid to structural or physical details further than they may be necessary for an understanding of the methods which form the subject matter of this application; the apparatus in itself being reserved as the subject matter of separate applications. Furthermore, not only as regards the physical apparatus of Fig. 1 but also as regards the other apparatus herein described, it will be understood that the method invention is not restricted to the use of the specifically described apparatus; that apparatus, in so far as the method is concerned, being only typical of apparatus suitable to the method, as will be more fully understood and recognized from a consideration of the fundamentals involved in the method.

The apparatus shown in Fig. 1 comprises a suitable tank or closed shell 10 having a tangentially arranged emulsion inlet 11 arranged near its lower end, the emulsion being discharged under a conical baffle plate 12 and flowing spirally downwardly under the edge of the baffle plate and thence up through the higher parts of the tank interior. These provisions are merely to obtain a uniform distribution and quiet flow of the emulsion upwardly through the tank. At the bottom of the tank, at any suitable location, there may be a water and sludge outlet 13, while the oil outlet is located at any suitable point at the top of the tank, as at 14.

Suspended centrally within the tank is an electrode column 15 around which the spaced sets of inner live electrodes 16, $16^a$, $16^b$, $16^c$ are located. Structural details of the electrode column 15 need not be explained; it is hung and insulated from the tank shell in any suitable manner, as by insulators 18. Horizontally opposite each internal electrode set there is a corresponding external electrode set 19, $19^a$, $19^b$, $19^c$. Each of the electrode sets may typically be composed of a plurality of electrodes each of sheet metal and of annular form. Thus the external electrodes 19, etc., are composed of sheet metal annuli 20 whose outer peripheries may rest, or substantially rest, against the inner surface of the tank shell and thereby be grounded upon the shell. These external electrode plates may be spacedly supported in any suitable manner, as by the supporting rods indicated at 21.

Likewise the internal electrode sets 16, etc., may be composed of sheet metal annuli 22 supported in proper spaced relation upon sheet metal supporting members 23 which are in turn mounted upon the electrode column 15; the individual electrodes 22 being spacedly supported so that there is an internal electrode 22 preferably directly opposite each external electrode 20; and the several sets of both external and internal electrodes are so arranged and spaced that a considerable space free of electrodes is left between the successive sets so that emulsion passing upwardly through the tank alternately passes through active fields and zones where that electrical activity is comparatively small.

The electrodes here described may be taken to be merely typical in their physical form of any suitable electrode calculated to accomplish the desired results. As is well known, electrodes with sharp or thin edges or points are desirable; the ones here shown have thin edges; but sharp points or serrations may be used, and the electrode plates may be arranged in any suitable relative positions, just so long as they present suitable ionic discharge points or edges at suitable spacings.

In the illustrative type of apparatus here described it is characteristic that the distances between the electrodes of several sets shall progressively diminish in the direction of emulsion flow. Although this progressive diminution of electrode distance may be accomplished in several different manners, it is provided for in the present apparatus principally by making the annular electrodes of the inner active sets to be of progressively increasing diameter. The rate of resultant decrease of electrode separation is a matter of design and may depend upon the character of the emulsion being treated, the rate at which it is desired to put the emulsion through the apparatus and also the rate at which the emulsion breaks down, as hereinafter referred to; but the diagram shows in substantially correct proportions a design which may be effective as applied to average California emulsions. For instance, in the design here shown the electrode separation distance of the lowermost electrode set, $16^c$ and $19^c$, is about 20 inches; the distance between electrodes $16^b$ and $19^b$ is about 13 inches; that of the next set 16ª, 19ª, is about 7 inches; while that of the next set, 16, 19, is shown to be about 5 inches at the lowermost electrodes and diminish to about 3 inches at the uppermost electrodes. The free vertical distance between successive sets of electrodes (the vertical distance through which the emulsion travels from a position where it is directly between the uppermost electrodes of one set to a position where it is directly between the lowermost electrodes of the next set) is here about 18 inches.

Suppose now that an emulsion is being flowed through the tank, flowing in at the bottom at 11, being thrown into swirling motion, and slowly and quietly flowing up through the tank. The emulsion first passes between the lowermost electrode set 16ᶜ, 19ᶜ and is there subjected to an ionic action of an intensity depending upon the electrode spacing and the applied voltage. For the purposes of explanation I will assume a potential of 16,000 volts. With a 20 inch spacing this will give a potential gradient of 800 volts per inch. The emulsion as it passes between electrode set 16ᶜ, 19ᶜ thus passes through an electric field of that potential gradient. Although direct current may attain results in my system I prefer to use alternating current for several reasons. Alternating current of high potential is more easily obtainable; and in an alternating field the ionic discharges are sent out from each electrode in successive waves of opposite signs, the pulsating wave travel toward the opposite electrode being substantially slower than is the constant ionic travel in a direct current field. Thus, using alternating current, the water globules initially in contact with the electrodes are ionized positively at one electrode and negatively at the other electrode, and are repelled by their respective electrodes and attracted by the opposite electrode. Then upon change of sign of the electrodes, a succeeding wave of water globules is ionized, opposite in sign to those previously ionized, and these succeeding waves move toward the respective opposite electrodes. This action goes on until the waves from the opposite sets of electrodes may have met or passed each other or may have extended clear across the space between the electrodes. When all the minute particles have thus become ionized, particles of opposite signs tend to coalesce, forming a larger but neutral particle. These larger particles must again be ionized, and again coalesce; and this action must be repeated many times in order to form bodies large enough to drop out. An ideal condition of operation is that, in the first field, the particles have been ionized and re-ionized enough times that at least some, but not all, of the water begins to settle; because with some of the water removed in each field, a higher and thus more effective potential gradient can be used to ionize the remaining water particles in successive fields.

Thus, the result of the action in the first field is that oppositely ionized water particles coalesce to form larger water particles, and at least some of the water is thus gathered together into particles or bodies large enough to sink relatively through the upwardly moving emulsion, sinking fast enough to drop down through the tank, or at least initially sinking fast enough as not to be carried up with the moving emulsion to the next active field. The emulsion going into the next active field between electrodes 16ᵇ and 19ᵇ carries less water, and, due to the presence of less water, the di-electric strength of the emulsion is much increased and a higher potential gradient can be used without danger of forming a conductive path. Thus, in the illustration given, the total voltage is applied across a distance of 13 inches with a correspondingly higher potential gradient. Here water particles are again ionized, but to higher activity; with the result that the remaining particles of water can act to coalesce to form larger particles and bodies. Although such coalesence I find will take place while the water particles are directly in the electric field, I find it advantageous to pass the emulsion first through the active field and then through a zone in which the ionizing effect is relatively weak and the vertical velocity of the emulsion slowed down. In the active field the particles are being ionized by contact and are being moved across the space between opposite electrodes, the ionized particles being thus actively distributed throughout the mass of emulsion. Then when these distributed ionized particles pass into a relatively quiescent zone, where they are not so actively moved by electrical stress or by physical flow, they are given greater freedom to act undisturbed under the influence of their own ionic charges and to thus coalesce to form larger particles. Whether the major portion of the coalescing action takes place directly between the electrodes or in the relatively quiet spaces between the successsive electrode sets is not material; but the coalescing action in the spaces between successive active fields, although not necessary to my system, appears to add materially to the total efficiency of coalescing and separating operation.

As a certain proportion of the water is effectively removed from the emulsion as a result of action at each successive active field, the emulsion moves on up to the succeeding fields of higher gradients until, having been freed of substantially all its water, the emulsion can then pass into the very intense field between the uppermost electrode sets 16, 19 where practically all the remaining water is ionized and coalesces in large enough bodies to drop out. It will be understood, of course, that although different emulsions will be flowed at different rates through any given apparatus, the flow is never fast enough to carry the larger bodies of water up along with the emulsion, so that the larger bodies of water immediately have a tendency to sink under gravity. These larger bodies of water sinking through the emulsion from an upper field come into contact and coalesce not only with other larger coalesced bodies but also with original small water particles. Thus as the water sinks through the emulsion the water bodies become larger and sink more quickly. In full operation the condition within the dehydrator at any instant may be visualized as follows: between the lowermost electrodes the original emulsion is flowing upwardly with its contained minute water particles; and at the same time rather large bodies of water are sinking through that emulsion between the electrodes, these water bodies sinking to the bottom of the tank where the water is withdrawn. Between the succeeding electrode sets above, the upwardly flowing emulsion contains less and less water in the original minutely divided form, and also there is correspondingly less mass of water sinking in comparatively large bodies; until in the uppermost field between the uppermost electrodes there is very little water present either in original minute particles or in coalesced bodies. Thus, for two reasons, the di-electric strength of the mixed substances between the upper electrodes is greater than the di-electric strength of the mixed substances between the lower electrodes; and, correspondingly, the tendency to form effectively conductive chains across the upper electrodes is less than at the lower electrodes. In designing the dehydrator apparatus for any particular emulsion both controlling factors are taken into account; so that, in actual operation, the potential gradient may be maintained in each field as high as practicable without danger of conductive power arc chain formation. Thus in a properly designed apparatus for any particular emulsion, the highest possible efficiency of ionic action is maintained in each field, with a resultant highest possible total efficiency of the whole apparatus. It may, however, be impracticable to design an apparatus specifically for every emulsion; or to use a specifically designed apparatus on one emulsion alone. Consequently in an apparatus of the type that has now been described, the electrode spacings may be designed in practice to suit an average of the emulsions to be treated in the apparatus; and then, by proper selection of total potential difference, and rate of emulsion flow through the apparatus, the best possible practical efficiency may be attained. In any given apparatus it will, of course, be readily understood that an emulsion which contains a higher percentage of water, or which breaks down more hardly and slowly, will be run relatively more slowly through the apparatus.

So far I have described how the potential gradient acting upon the emulsion at any stage of procedure is varied, more or less accurately, inversely as the conductivity of the emulsion. But I have assumed that a certain total potential difference, which may be selected and determined for any particular emulsion, will be constantly used upon the whole apparatus, the variation of potential gradient being accomplished by varying electrode spacings. I will now describe how the total potential difference may be automatically controlled inversely as the conductivity of the emulsion, so that, either for the apparatus as a whole or for each individual electrostatic field, the potential gradient may be made to vary inversely as the conductivity, and is maintained at all points as high as practicable without formation of conductive water chains. Using an apparatus of the type hereinbefore described, the automatic means now about to be described automatically controls and maintains the potential gradient at the most efficient point for the apparatus as a whole, automatically maintaining the most efficient potential gradients for different or varying emulsions and automatically taking care of any temporary low resistance paths which may be formed between electrodes. And furthermore, the automatic controls I shall now describe are not only applicable, in accordance with my ideas, to a simple dehydrator tank, or to a dehydrator of the type of Fig. 1, to control the potential for such an apparatus as a unit; but is also applicable, as I hereinafter point out, individually to each of the electric fields of the apparatus of Fig. 1.

In Fig. 2 let D represent diagrammatically a dehydrator apparatus of the type shown in Fig. 1. The high potential alternating current is fed to the dehydrator through the lines 30, 31, the line 30 going through the inlet bushing 32 and connecting, as shown at 33 in Fig. 1, with the electrode column 15. The other line 31 may connect at any point with the tank shell, which is grounded. These feed lines 30, 31 are fed from a secondary of a suitable transformer T whose primary is in the circuit 33, 34. For purposes of explanation, but not a limitation upon the invention, I will presume that the potential in 33, 34 is 110 volts and that the transformer at full potential is designed to impress 16,500 volts on the circuit 30, 31.

The primary leads 33, 34 of transformer T are fed from an auto-transformer T¹, so circuited as to be capable of supplying a variable potential. For instance, transformer T¹ has a plurality of taps 35 leading to a series of normally open relays R, R¹ R², etc. The other side of each of these relays is connected directly to lead 34 going to transformer primary T. The closure of any one relay R, R¹, etc., will throw into the circuit of leads 33, 34 a certain determined portion of the winding of auto-transformer T¹ and thereby to put upon the circuit of transformer primary T a certain selected potential. Relays R, R¹ etc., are actuated by individual circuits which are controlled by auxiliary relays r, r¹ etc., normally open. One side of each of these last mentioned relays is connected directly to the 110-volt lead 40, and from the other side of each relay an individual wire 41 goes to one side of the winding of the corresponding relay R, R¹ etc., the other sides of the windings of these last mentioned relays being all connected directly to the opposite lead wire 42 of the 110 volt circuit.

The normally open auxiliary relays r, r¹ etc., are actuated by circuits controlled by a deflector instrument A which is actuated by the current flowing through the circuit 33, 34. For instance a small current transformer T³ with its primary lead 34 feeds the instrument, through the circuit 43, with a relatively small amount of current which varies in accordance with variation of the current flow through the lead 34. Swinging arm 45 of this instrument makes contact through finger 45ᵃ with a series of contacts 46 which are connected by wires 47 each to one side of the winding of a relay r, r¹ etc., the other sides of these relay windings being connected directly to wire 49 which forms the other side of the instrument controlled circuit. The instrument diagrammed at A Fig. 2 is simply an indication of a suitable device for the purpose—any suitable instrument can be used. The contact arm 45 will preferably not be directly actuated by the coils 45ᵇ but an arm 45ᶜ will be so directly actuated and arm 45 given a delayed action through a yoke 45ᵈ, with the sides of which arm 45ᶜ engages after a certain amount of free movement. Such an arrangement prevents oscillations from being set up and makes the control action steady. The voltage in this instrument controlled circuit is preferably comparatively low. For instance a 6 volt battery and charger set B may be used, a 110-volt charging circuit 50 feeding into the charger to maintain the battery charged. The wire 49 leads through a fuse and switch S to one side of the battery B and a wire 51 leads, through S, from the other side of the battery to the ammeter arm 45. In the illustration the instrument arm swings toward the right as the current increases. In a position furthest to the left, with minimum current flowing through the primary of transformer T the instrument arm will close the actuating circuit to relay r⁴ causing that relay to close and the closure of that relay closes the connecting circuit to relay R⁴, causing that relay to close. With relay R⁴ closed current will be taken off the auto-transformer T¹ utilizing its full winding and therefore obtaining the full potential of 110 volts for the circuit 33, 34 of the primary transformer T, and therefore putting upon the secondary circuit 30, 31 the maximum potential for which the system is designed. This maximum potential, it will be noted, is only applied to the dehydrator when the current flow is lowest—when the conductivity of the emulsion between electrodes is lowest. If for any reason the emulsion conductivity is greater, the instrument arm swings toward the right, closing the actuating circuit for relays r³, r² etc., in turn, these relays in turn closing the corresponding actuating circuits for the relays R³, R² etc., and thus cutting down the proportionate effective part of the transformer winding of T¹ used as a secondary, thus cutting down the potential impressed upon circuit 33, 34 and correspondingly the potential impressed upon circuit 30, 31 and the dehydrator. Sufficient has now been described for a complete understanding of how the potential applied to the dehydrator D is automatically controlled and varied inversely as to the conductivity of the emulsion or mixture within the dehydrator. As that conductivity increases and the current in the circuit 33, 34 correspondingly increases, the instrument arm swinging toward the right closes the relays r⁴, r³ etc., successively thereby closing relays R⁴, R³ successively and thus step by step cutting down the voltage obtained from auto-transformer T¹.

If for any reason the conductivity of the emulsion in the dehydrator increases so much as to overload the system (for instance if a temporary path of very low resistance is formed through the emulsion, or flash-over occurs) the instrument arm swinging clear over to the right comes into contact with the last contact 46ᵃ. This contact is connected by wire 47ᵃ to one side of the actuating coil of a normally closed relay r⁵, the other side of that relay coil being connected directly to the battery lead 49. Relay r⁵ normally closes the circuit including the two wires 60, which lead off, in series, from a main control wire 61 that goes from the main switch control S¹ to the remote control switch set C. The function of relay r⁵ is to immediately open the supply circuit to the whole system if an overload occurs. In the typical wiring diagram shown in Fig. 2 the initial current supply leads 62 and 63 lead in to contacts 64 and 65 of the main control switch S¹. The switch arms 66 and 67 of this switch are moved to, and held in, their closed position by the magnet indicated at 68, one side of the magnet being connected by wire 69 with main lead wire 63, and the other side of the magnet being connected directly to the control wire 61. This control wire 61 has a series branch composed of two wires 70 that lead to a float controlled switch F located in the dehydrator. See Fig. 1. This float switch may be of any suitable type; it is shown as a float F¹ rising to lift a contact F² into engagement with a contact F³. This float controlled switch is only closed when the dehydrator is full of liquid, thus rendering it impossible to operate the system unless the dehydrator is properly filled. Main control wire 61 also has a series branch composed of the wires 60 hereinbefore referred to, controlled by a normally closed relay $r^5$. Then wire 61 goes on to the remote control set C. This remote control set may be composed of any suitable apparatus. For instance it may comprise two of the well known push-button stations C¹ and C². The functions of C¹ and C² are such that pushing either of their "starting" buttons will connect wire 61 with control wire 72, this wire connecting directly with the initial supply lead 62. If float switch F and relay $r^5$ are closed, starting operation of either C¹ or C² will thus throw current through magnet 68, causing the main switch to close. The current then flows from the lead 62, 63 through the main switch and thence through leads 73, 74 to auto-transformer T¹. Immediately the main switch is in closed position then the switch arm 66ª is in engagement with a switch contact 64ª, switch arm 66ª being electrically connected with arm 66. Contact 64ª is connected to control wire 72ª which goes to the remote control stations. Control switches C¹ and C² are of such a nature that within them wire 72ª, through its series extension 72ᵇ, is normally connected with the main control wire 61. Thus as soon as the main switch is closed current to energize magnet 68 will flow from wire 61 through the normally closed switches of C¹ and C² to the wire 72ª and through contact 64ª, switch arm 66ª and contact 64 to the main lead 62, keeping the main switch magnet 68 energized although the starting button has been but temporarily depressed. But, as will be readily recognized from a consideration of the circuiting, the temporary opening of either the normally closed relay $r^5$ or of the float controlled switch F will de-energize magnet 68 and allow the main switch immediately to open. In fact these two last mentioned switches, the float controlled switch and the normally closed relay, are seen to be in series with the "stopping" switches of C¹ and C², so that temporary opening of the circuit at any of these points will cause opening of the main switch.

The battery charging circuit which includes the wires 50 may be fed through switch S² from wires 50ª which connect to the initial leads 62 and 63. The wires 40 and 42 which form the common feed wires for the relay sets $r$, $r^1$, etc., and R, R¹, etc., are connected through switch S³ and wires 40ª and 42ª with wires 73 and 74 respectively.

It will be seen that the fundamental characteristic of the system of Fig. 2 is to vary the applied voltage inversely as the conductivity of the emulsion or mixture in the dehydrator. Now that function may either be applied to the dehydrator of Fig. 1 as a whole, or to a simple dehydrator of any type. For instance, suppose that the dehydrator indicated at D in Fig. 2 represents the apparatus of Fig. 1. The function of the system of Fig. 2 then is to control the voltage inversely as the total conductivity of the various parts of the emulsion body between all of the electrode sets. This means that fundamentally the automatic control system will regulate the voltage generally to suit the different conductivities of different emulsions that may be put through the dehydrator, controllably varying the total potential applied to the electrodes in such a manner that, as a whole, the highest practicable potential is applied to the dehydrator. In thus regulating the potential applied to the dehydrator as a whole, the applied potential will of course depend for its control upon the total conductivity of the emulsion in the several electric fields; and that in turn may, under some circumstances at least, depend very largely upon the conductivity in a single field where the conductivity for any reason, either temporary or continuing, is higher than in other fields. In a dehydrator that has been perfectly designed for a given emulsion, passing at a given rate through the apparatus, the conductivities in the several fields may be substantially the same, so that no one path of current flow will tend to rob the others. On the other hand, in any practical design and when treating different emulsions, one path of flow may have a substantially greater conductivity than the others and may thus tend somewhat to rob the others and, if the potential were not controlled, tend to rapidly build up a path of low resistance and conductive chain formation, and cause a power arc. The automatic control system prevents this; as it also prevents any temporary tendency to form a conductive power arc chain.

Thus in the whole combined system there are two distinct means of applying to the emulsion or mixture a potential that is controllably varied inversely in proportion to the conductivity. The dehydrator apparatus has one such means within itself; the automatic electrical controlling system constitutes another such means. The arrangement within the dehydrator itself specifically constitutes means to vary the applied potential as the emulsion is dehydrated; the arrangement in the automatic control system specifically constitutes means for controllably varying the applied potential to the emulsion as a whole; and together these two means form a combination wherein the applied potential is controllably varied inversely as the conductivity both to suit the conductivity of the emulsion as a whole and to suit its changing conductivity as it is dehydrated.

Now these same general objects and characteristics of the invention may be accomplished by other combinations. For instance, suppose that the dehydrator of Fig. 1 constitutes only one set of electrodes and that the oil is treated either by continuously flowing between these electrodes or is treated as a batch. The control system of Fig. 2 will in that case act the same as before described. To explain this embodiment of my invention more fully reference is had to Fig. 3. In simple diagram, for the purposes of this explanation, let $C^1$ represent a complete control system such as shown in Fig. 2. In simple diagram a treating tank is shown at $10^a$ equipped with a single electrode set 160, 190 of uniform spacing. In this simple diagram let $11^a$ indicate the emulsion feed, $13^a$ the water outlet and $14^a$ the oil outlet. If emulsion is constantly run through such an apparatus and oil and water constantly taken off, the function of $C^1$ is to regulate and control the applied potential, and therefore the applied potential gradient, inversely in accordance with the conductivity of the emulsion or mixture as a whole, that at any time lies between the electrodes. If, on the other hand, a batch of emulsion is put into tank $10^a$ and allowed to stand there until its dehydration is completed, then the function of $C^1$ is not only to controllably vary the applied potential inversely in accordance with the initial conductivity of the emulsion or mixture, but also to controllably vary that potential inversely in accordance with the changing conductivity of the emulsion or mixture as it is dehydrated. As the water falls out of such a batch of emulsion its varying conductivity between the electrodes becomes less and the applied potential consequently becomes greater. In either of these cases the applied potential is in general controlled inversely in accordance with the initial conductivity of different emulsions which may be treated; and in the second case the potential is controlled also in accordance with the changing conductivity of the dehydrating emulsion.

Thus my invention may be carried out in a simple form of dehydrator apparatus; but considerations of capacity, the desirability of not utilizing too high gradients, and the desirability of using wide spaced electrodes to prevent conductive chain formation where there is much water present, make it desirable that a dehydrator with electrode sets at progressively decreasing spacings be used. And the complete combined system may be utilized in such a manner that the applied potential, the resulting potential gradient, may be independently controlled for each of the electric fields; thereby accomplishing by automatic electrical regulation everything that is accomplished by the combination of the apparatus of Fig. 1 with the electrical system of Fig. 2.

In Fig. 4, in simple diagram, an apparatus arrangement similar to that of Fig. 1 is shown, except that here the several internal electrode sets 161, $161^a$, $161^b$, etc., are not connected together and each has an individual feed wire $30^a$, $30^b$, $30^c$ etc. $C^1$, $C^2$, $C^3$ etc., represent each a complete control system such as shown in Fig. 1, the wires $30^a$, $30^b$, $30^c$, etc., leading out of these control systems individually to the inner electrodes. The other output wires $31^a$ from control systems $C^1$, $C^2$ etc., may connect with a common wire $31^b$ which grounds upon the tank. The dehydrator tank itself may be operated as before described, the emulsion flowing upwardly through it, clean oil being taken out at the top and water and sludge at the bottom. Each control system $C^1$, $C^2$ etc., will operate individually as regards its corresponding electrode set, fully to control the applied potential and potential gradient inversely in accordance with the varying conductivity of the emulsion or mixture at the electrode set. Theoretically, in such a combined system, the electrode sets may be of uniform spacing; but it will be preferable even here to have the spacings progressively diminish so that excessive gradients need not be used any place in the system. Using a plurality of electrode sets, they can be arranged at uniform electrode spacings, and the potential controlled exclusively by the automatic system. But the presence of a relatively large proportion of water between the lower electrodes, and some at least of that water being in comparatively large bodies, makes it desirable in any arrangement, just as in Fig. 1, that the lower electrodes be more widely spaced to prevent formation of conductive chains. But, whatever the electrode spacing may be, the automatic electrical controls fully and completely controllably vary the applied potential and potential gradient not only inversely in accordance with the different conductivities of different emulsions which may be treated, but also fully to suit the changing conductivities of any given emulsion at any instant between each of the electrode sets. The treatment is therefore kept up to the highest efficiency at all times.

I claim:

1. The system of separating the constituents of a water-in-oil emulsion, that includes passing the emulsion successively through spaces between electrode sets, maintaining on the first electrode set a potential gradient substantially just lower than that which will cause formation of conductive water chains in the emulsion passing that set, thereby causing substantially exclusive ionic flow between the electrodes, ionizing the water particles and inducing their coalesence and subsidence, and maintaining likewise on a successive electrode set a potential gradient substantially just lower than that which will cause formation of conductive water chains in the emulsion passing that set, causing further ionic flow and ionization and coalesence of the water particles; the gradients at the several electrode sets being proportioned inversely as the emulsion conductivities at the several electrode sets.

2. The system of separating the constituents of a water-in-oil emulsion, that includes passing the emulsion successively through spaces between electrode sets, maintaining on the first electrode set a potential gradient substantially just lower than that which will cause formation of conductive water chains in the emulsion passing that set, thereby causing substantially exclusive ionic flow between the electrodes, ionizing the water particles and inducing their coalesence and subsidence, and maintaining likewise on a successive electrode set a potential gradient substantially just lower than that which will cause formation of conductive water chains in the emulsion passing that set, causing further ionic flow and ionization and coalesence of the water particles; the gradients at the several electrode sets being automatically maintained, under control of the emulsion conductivities, in proportion inversely as the emulsion conductivities at the several electrode sets.

3. The system of separating the constituents of an emulsion composed of relatively conductive and non-conductive components, that includes passing the emulsion successively through electric fields, and maintaining in each field an electric stress sufficient to cause exclusively ionic conduction of current through the emulsion as it passes through that field.

4. The system of separating the constituents of an emulsion composed of relative conductive and non-conductive components, that includes passing the emulsion successively through spaces between electrode sets, maintaining between the first electrode set a potential gradient sufficient to cause exclusive ionic current convection through the emulsion between the electrodes of that set and thereby causing coalescence of the particles of the conductive component and the separation of that component by gravity, and maintaining likewise between a successive electrode set a potential sufficient to cause exclusive ionic current convection through the emulsion between the electrodes of that set and thereby causing further coalescence and separation; the gradients between the electrodes of the several sets being maintained substantially inversely in proportion to the varying conductivity of the emulsion flowing between the several sets.

5. Apparatus for the system herein described, comprising a suitable tank with provisions for flowing an emulsion through it, a series of electrode sets arranged in the path of the flow of emulsion, the spacings of the electrode sets being progressively diminished in the direction of emulsion flow, and means for applying to the electrode sets as a whole a potential varying inversely as the total conductivity of an emulsion flowing between all the electrode sets.

6. Apparatus for the system herein described, comprising a suitable tank with provisions for flowing an emulsion through it, a series of electrode sets arranged in the path of the flow of emulsion, the spacings of the electrode sets being progressively diminished in the direction of emulsion flow, and said progressive diminution being directly proportionate to the decreasing conductivity of an emulsion as its relatively electrical conductive component is progressively removed, and means for applying to the electrode sets as a whole a potential varying inversely as the total conductivity of an emulsion flowing between all the electrode sets.

7. Apparatus for the system herein described, comprising a suitable tank with provisions for flowing an emulsion through it, a series of electrode sets arranged in the path of the flow of emulsion, the spacings of the electrode sets being progressively diminished in the direction of emulsion flow, and said progressive dimunition being directly proportionate to the decreasing conductivity of an emulsion as its relatively electrical conductive component is progressively removed, and means for applying to the electrode sets as a whole a potential varying inversely as the total conductivity of an emulsion flowing between all the electrode sets, said means including an instrument actuated by the current flowing through the emulsion, and voltage control circuits controlled by said instrument.

In witness that I claim the foregoing I have hereunto subscribed my name this 8th day of September, 1927.

JOHN M. CAGE.